United States Patent
Shimada

(10) Patent No.: US 9,319,614 B2
(45) Date of Patent: Apr. 19, 2016

(54) IMAGE PICKUP DEVICE WITH A GROUP OF FOCUS DETECTION PIXELS ASSOCIATED WITH A DEDICATED READOUT CIRCUIT AND IMAGE PICKUP APPARATUS INCLUDING THE IMAGE PICKUP DEVICE

(71) Applicant: Olympus Corporation, Shibuya-ku, Tokyo (JP)

(72) Inventor: Yoshinao Shimada, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/512,631

(22) Filed: Oct. 13, 2014

(65) Prior Publication Data

US 2015/0237282 A1 Aug. 20, 2015

(30) Foreign Application Priority Data

Feb. 20, 2014 (JP) .................................. 2014-030898

(51) Int. Cl.
*G03B 13/00* (2006.01)
*H04N 5/232* (2006.01)
*H04N 5/378* (2011.01)
*H04N 9/04* (2006.01)

(52) U.S. Cl.
CPC ........... *H04N 5/378* (2013.01); *H04N 5/23212* (2013.01); *H04N 5/23258* (2013.01); *H04N 5/23287* (2013.01); *H04N 9/045* (2013.01)

(58) Field of Classification Search
CPC ... H04N 5/23212; H04N 5/3696; G02B 7/28; G02B 7/36; G02B 7/34; G03B 13/36; G03B 7/28
USPC ................................................ 348/345–357
See application file for complete search history.

(56) References Cited

U.S. PATENT DOCUMENTS

| | | | | |
|---|---|---|---|---|
| 8,223,255 | B2* | 7/2012 | Yuyama | 348/345 |
| 8,953,089 | B2* | 2/2015 | Yasuda | 348/345 |
| 9,083,886 | B2* | 7/2015 | Theuwissen | |
| 2008/0025717 | A1* | 1/2008 | Kawanishi | 396/128 |
| 2009/0207298 | A1* | 8/2009 | Kawanishi | 348/345 |
| 2011/0149133 | A1* | 6/2011 | Kawanishi | 348/302 |
| 2011/0279727 | A1* | 11/2011 | Kusaka | 348/340 |
| 2013/0258168 | A1* | 10/2013 | Aoki | 348/349 |
| 2014/0009664 | A1* | 1/2014 | Kinugasa | 348/350 |
| 2014/0183332 | A1* | 7/2014 | Theuwissen | 250/208.1 |
| 2014/0192249 | A1* | 7/2014 | Kishi | H04N 5/23212 348/349 |
| 2014/0198239 | A1* | 7/2014 | Suzuki | H04N 5/23212 348/246 |
| 2014/0232913 | A1* | 8/2014 | Sakane | H04N 5/235 348/294 |
| 2014/0285706 | A1* | 9/2014 | Theuwissen | 348/350 |
| 2014/0347505 | A1* | 11/2014 | Suzuki | H04N 5/23212 348/208.1 |

(Continued)

FOREIGN PATENT DOCUMENTS

| | | |
|---|---|---|
| JP | 2010-181751 | 8/2010 |
| JP | 2013-009294 | 1/2013 |
| JP | 2013-051497 | 3/2013 |

*Primary Examiner* — Chia-Wei A Chen
(74) *Attorney, Agent, or Firm* — John C. Pokotylo; Straub & Pokotylo

(57) ABSTRACT

Provided is an image pickup device including: an image pickup pixel group including a plurality of pixels arrayed in a matrix; a focus detection pixel group of focus detection pixels discretely arranged in the image pickup pixel group; a first readout circuit including a first AD converter that converts only pixel signals from the image pickup pixel group to digital signals; and a second readout circuit including a second AD converter that converts only pixel signals R, L, T and B from the focus detection pixel group to digital signals.

9 Claims, 11 Drawing Sheets

(56) References Cited

U.S. PATENT DOCUMENTS

| | | | |
|---|---|---|---|
| 2015/0022699 A1* | 1/2015 | Shimada | 348/273 |
| 2015/0156428 A1* | 6/2015 | Uchida | H04N 5/376 348/294 |
| 2015/0163392 A1* | 6/2015 | Malone et al. | 348/228.1 |
| 2015/0237253 A1* | 8/2015 | Shimokawa | H04N 5/23212 348/281 |
| 2015/0256778 A1* | 9/2015 | Kusaka | G03B 13/36 348/302 |

\* cited by examiner

FIG. 11

| | | SEQUENCE | | | | |
|---|---|---|---|---|---|---|
| | | A | B1 | B2 | C1 | C2 |
| PRESENT APPLICATION | FOR IMAGE PICKUP | ON | ON | OFF | — | — |
| | FOR FOCUS DETECTION | ON | OFF | ON | — | — |
| | POWER CONSUMPTION RATIO | 1 (REFERENCE) | 0.9375 | 0.5625 | 0.7500 | 0.5625 |
| CONVENTIONAL | FOR IMAGE PICKUP | ON | ON | ON | — | — |
| | FOR FOCUS DETECTION | ON | ON | ON | — | — |
| | POWER CONSUMPTION RATIO | 1.0000 | 1.0000 | 1.0000 | 1.0000 | 0.6667 |

IMAGE PICKUP DEVICE WITH A GROUP OF FOCUS DETECTION PIXELS ASSOCIATED WITH A DEDICATED READOUT CIRCUIT AND IMAGE PICKUP APPARATUS INCLUDING THE IMAGE PICKUP DEVICE

CROSS REFERENCE TO RELATED APPLICATION

This application claims benefit of Japanese Application No. 2014-030898 filed in Japan on Feb. 20, 2014, the entire contents of which are incorporated herein by this reference.

BACKGROUND OF THE INVENTION

1. Field of the Invention

The present invention relates to an image pickup device in which a group of focus detection pixels for detecting a focus based on a phase difference are discretely arranged in an image pickup pixel group, and an image pickup apparatus including the image pickup device.

2. Description of the Related Art

In recent years, image pickup devices in which focus detection pixels that receive and photoelectrically convert light fluxes resulting from pupil division are discretely arranged in an image pickup pixel array, i.e., image pickup devices that perform what is called image plane phase difference AF, have been put into practical use and commercialized. A phase difference occurs between the light fluxes resulting from the pupil division according to displacements from a focal position, and the focus detection pixels are intended to detect the phase difference.

The focus detection pixels are arranged at a certain ratio relative to image pickup pixels, and the arrangement ratio is a relatively large ratio, for example, a ratio of one pixel out of eight pixels. Also, the arrangement range of focus detection pixels arranged in image pickup devices are changing from an arrangement range that is only a particular partial region of the pixel section to an arrangement range that is a larger region (for example, the entire pixel section), that is, the arrangement range tends to enlarge. Thus, the total number of focus detection pixels included in the image pickup devices amounts to some large number.

For readout of the focus detection pixels, there are several schemes that can be employed according to, e.g., the readout frequency (readout rate), the instantaneousness and/or the readout method, and it is preferable to optimize readout efficiency for each readout scheme.

For example, Japanese Patent Application Laid-Open Publication No. 2010-181751 describes an image pickup apparatus that performs image plane phase difference AF, the image pickup apparatus being configured to select a plurality of thinned readout modes. The image pickup apparatus includes: an image pickup device that includes a group of first pixels that generate first signals for image generation and a group of second pixels that generate second signals for phase difference detection by dividing a pupil region of a taking lens; a focus adjustment section that adjusts a focus of the taking lens based on the signals from the group of second pixels; a readout section having a first thinned readout mode in which signals from a plurality of pixels are thinned out at a predetermined thinning ratio and a thinning phase and then read out, and a second thinned readout mode in which signals from a plurality of pixels are thinned out at a thinning ratio and a thinning phase, at least either of the thinning ratio and the thinning phase being different from that of the first thinned readout mode, and read out; and a selection section that selects either of the first thinned readout mode and the second thinned readout mode for operation of the image pickup apparatus, according to the state of the image pickup apparatus. It is then described that in an image pickup apparatus including an image pickup device in which focus detection pixels are discretely arranged, image quality deterioration attributable to focus detection pixels is suppressed when pixel signals are read out from the image pickup device in a thinned-out manner.

Column parallel-type AD converters are proposed as a configuration for reducing an AD conversion processing time period in image pickup apparatuses, and examples thereof include an image pickup apparatus described in Japanese Patent Application Laid-Open Publication No. 2013-051497. In the image pickup apparatus, a reference signal having a first gain, and a reference signal having a second gain that is different from the first gain, which are reference signals for converting levels of analog pixel signals obtained from pixels to digital data, are generated at the time of pixel data level readout, the levels of the analog pixel signals and the reference signals are compared with each other, counting processing is performed in parallel with the comparison processing, a first count value at a point of time when the processing for comparison with the reference signal having the first gain is obtained as digital data, and if the first count value does not reach a predetermined threshold value, a second count value at a point of time when the processing for comparison with the reference signal having the second gain is obtained as digital data.

As the basic configurations of the image pickup apparatuses, currently, CMOS-type solid image pickup apparatuses using CMOS (complementary metal oxide semiconductor) transistors prevail, and general CMOS-type solid image pickup apparatuses employ a scheme in which signal charges generated by photoelectric conversion sections in respective pixels arrayed in a two-dimensional matrix are sequentially read out on a row-by-row basis. In this scheme, timings for exposure in the photoelectric conversion sections in the respective pixels are determined by a start and an end of signal charge readout, and thus, the exposure timings are different for the respective rows. Therefore, a simultaneous image pickup function (global shutter function) that provides signal charge accumulation simultaneity. This global shutter function is preferable also from the perspective of phase difference detection accuracy enhancement, and examples thereof include Japanese Patent Application Laid-Open Publication No. 2013-009294.

SUMMARY OF THE INVENTION

An image pickup device according to an aspect of the present invention includes: an image pickup pixel group including a plurality of pixels arrayed in a row direction and a column direction; a focus detection pixel group of focus detection pixels discretely arranged in the image pickup pixel group; a first readout circuit including a first AD converter that converts only signals from pixels belonging to the image pickup pixel group to digital signals; and a second readout circuit including a second AD converter that converts only signals from pixels belonging to the focus detection pixel group to digital signals.

Also, the image pickup apparatus according to an aspect of the present invention includes the image pickup device.

BRIEF DESCRIPTION OF THE DRAWINGS

FIG. 11 is a table indicating an example in which operating states of an image pickup readout circuit and a focus detection readout circuit and power consumption in each image pickup sequence in Embodiment 1 above are compared with those of a conventional technique.

DETAILED DESCRIPTION OF THE PREFERRED EMBODIMENT

An embodiment of the present invention will be described below with reference to the drawings.

Embodiment 1

Figure 1:
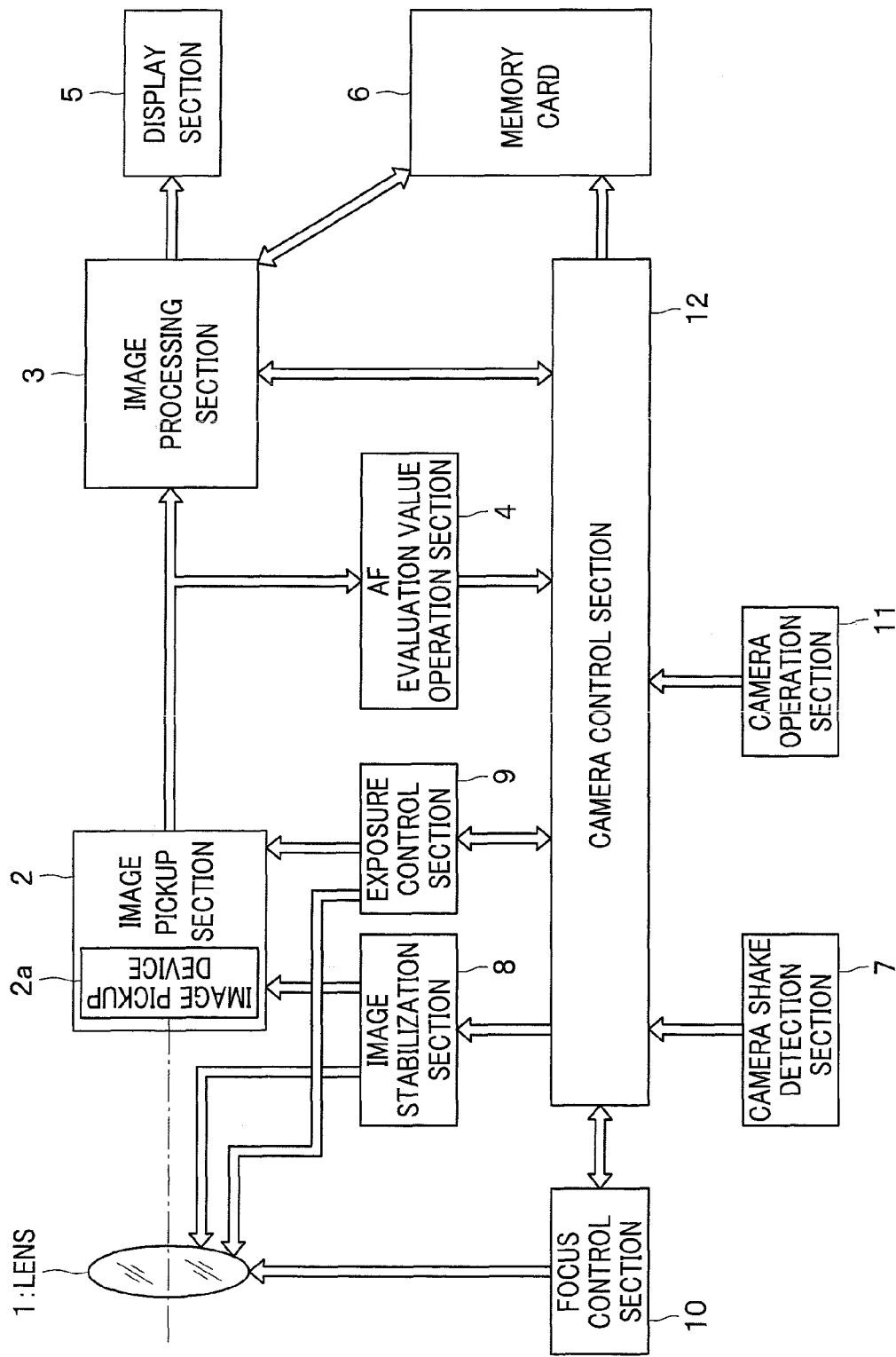
FIG. 1 is a block diagram illustrating a configuration of an image pickup apparatus according to Embodiment 1 of the present invention.

FIGS. 1 to 11 illustrate Embodiment 1 of the present invention, and FIG. 1 is a block diagram illustrating a configuration of an image pickup apparatus.

As illustrated in FIG. 1, the image pickup apparatus includes a lens 1, an image pickup section 2, an image processing section 3, an AF (automatic focusing) evaluation value operation section 4, a display section 5, a camera shake detection section 7, an image stabilization section 8, an exposure control section 9, a focus control section 10, a camera operation section 11 and a camera control section 12. Note that although FIG. 1 illustrates a memory card 6, the memory card 6 is not necessarily a component inherent to the image pickup apparatus because the memory card 6 is configured so as to be attachable/detachable to/from the image pickup apparatus.

The lens 1 forms an optical image of an object in an image pickup region in an image pickup device 2a included in the image pickup section 2. The lens 1 includes a focus lens for adjusting a focal position (point of focus) to perform focusing, and a diaphragm for controlling a range of light fluxes passing therethrough, and furthermore, in the present embodiment, the lens 1 has an image stabilization function.

The image pickup section 2 includes the image pickup device 2a that performs photoelectric conversion of the optical image of the object formed via the lens 1 and outputs the resulting image as image signals. Note that in the present embodiment, the image pickup device 2a includes a circuit that converts analog image signals obtained as a result of photoelectric conversion, into digital signals (later-described column parallel-type AD converter 23). Furthermore, although the present embodiment is described on the premise that the image pickup device 2a is a color image pickup device including a color filter having a Bayer array of primary colors (see FIG. 3), it should be understood that any of configurations other than such configuration may be employed. Also, the image pickup section 2 is configured so as to be movable in a plane perpendicular to a shooting optical axis of the lens 1, and has an image stabilization function.

The image processing section 3 performs various types of image processing on the image signals outputted from later-described image pickup pixels in the image pickup section 2. The image processing section 3 also performs, e.g., processing for performing an arithmetic operation to interpolate pixel values of later-described focus detection pixels in the image pickup device 2a, based on pixel values of image pickup pixels in the vicinity of the focus detection pixels.

The AF evaluation value operation section 4 calculates an AF evaluation value based on the image signals outputted from the image pickup section 2, and outputs the AF evaluation value to the camera control section 12. More specifically, the AF evaluation value operation section 4 is configured to calculate a phase difference based on signals read out from the focus detection pixels in the image pickup device 2a and outputs the phase difference as an AF evaluation value. Note that the AF evaluation value operation section 4 may be one that further calculates a contrast value based on the image signals outputted from the image pickup device 2a, and outputs the contrast value as an AF evaluation value (that is, contrast AF may further be performed in addition to phase difference AF).

The display section 5 displays an image based on the signals subjected to the image processing for display by the image processing section 3. The display section 5 is configured to provide live view display or still image display and also display, e.g., various types of information relating to the image pickup apparatus.

The memory card 6 is a recording medium for storing the signals subjected to image processing for recording by the image processing section 3.

The camera shake detection section 7 includes, e.g., an acceleration sensor, and detects a shake of the image pickup apparatus and outputs the shake to the camera control section 12.

The image stabilization section 8 moves at least either of the lens 1 and the image pickup section 2 so as to offset the detected shake, based on control performed by the camera control section 12 to reduce the effect of the shake on an optical object image formed on the image pickup region in the image pickup device 2a.

The exposure control section 9 controls a device shutter of the image pickup device 2a based on a shutter speed (exposure time period) determined by the camera control section 12, under the control of the camera control section 12 (the device shutter includes a global shutter, that is, a shutter that starts exposure for shooting by collectively resetting all the pixels in the image pickup device 2a and terminates the exposure by collectively transferring image signals from all the pixels after passage of a predetermined exposure time period) to obtain an image. Furthermore, the exposure control section 9 is configured so as to also perform, e.g., control of the diaphragm included in the lens 1 based on a diaphragm value determined by the camera control section 12. Here, the shutter speed and the diaphragm value are determined by the camera control section 12, based on, for example, a program diagram according to an APEX system, using, e.g., photometric data calculated based on the image signals outputted from the image pickup section 2 and a sensitivity set by the camera operation section 11. Also, the exposure control section 9 is configured to output drive information on the image pickup device 2a to the camera control section 12.

The focus control section 10 drives the lens 1 for focus adjustment. In other words, the focus control section 10 drives the focus lens included in the lens 1 based on control by the camera control section 12 that has received the AF evaluation value from the AF evaluation value operation section 4, so as to bring the object image formed on the image pickup device 2a into focus. As described above, the AF evaluation value operation section 4, the camera control section 12 and the focus control section 10 provide a focus detection/control section that detects and controls a focus state based on signals read out from the focus detection pixels in the image pickup device 2a (digital signals resulting from conversion by a later-described second AD converter) (thus, the image pickup apparatus according to present embodiment has a function as a focal point detection apparatus). Also, the focus control section 10 is configured so as to output lens drive information such as a lens position to the camera control section 12.

The camera operation section 11 is an operation section that allows various inputs to operate the image pickup apparatus. The camera operation section 11 includes operational members such as a power supply switch for powering the image pickup apparatus on/off, a release button for an input to provide an instruction to perform, e.g., still image shooting or moving image shooting and a mode button for setting, e.g., a still image shooting mode, a moving image shooting mode or a live view mode. Also, image pickup sequences A, B1, B2, C1 or C2, which will be described later, is automatically set according to an operating state of the image pickup apparatus, but may manually be selected. In this case, a selection operation is performed via the camera operation section 11.

The camera control section 12 controls the entire image pickup apparatus including the image processing section 3, the memory card 6, the image stabilization section 8, the exposure control section 9, the focus control section 10, etc., based on, e.g., the lens drive information from the focus control section 10, the AF evaluation value AF from the evaluation value operation section 4, the drive information from the exposure control section 9, processing information from the image processing section 3, the camera shake information from the camera shake detection section 7 and the operational inputs from the camera operation section 11.

Figure 2:
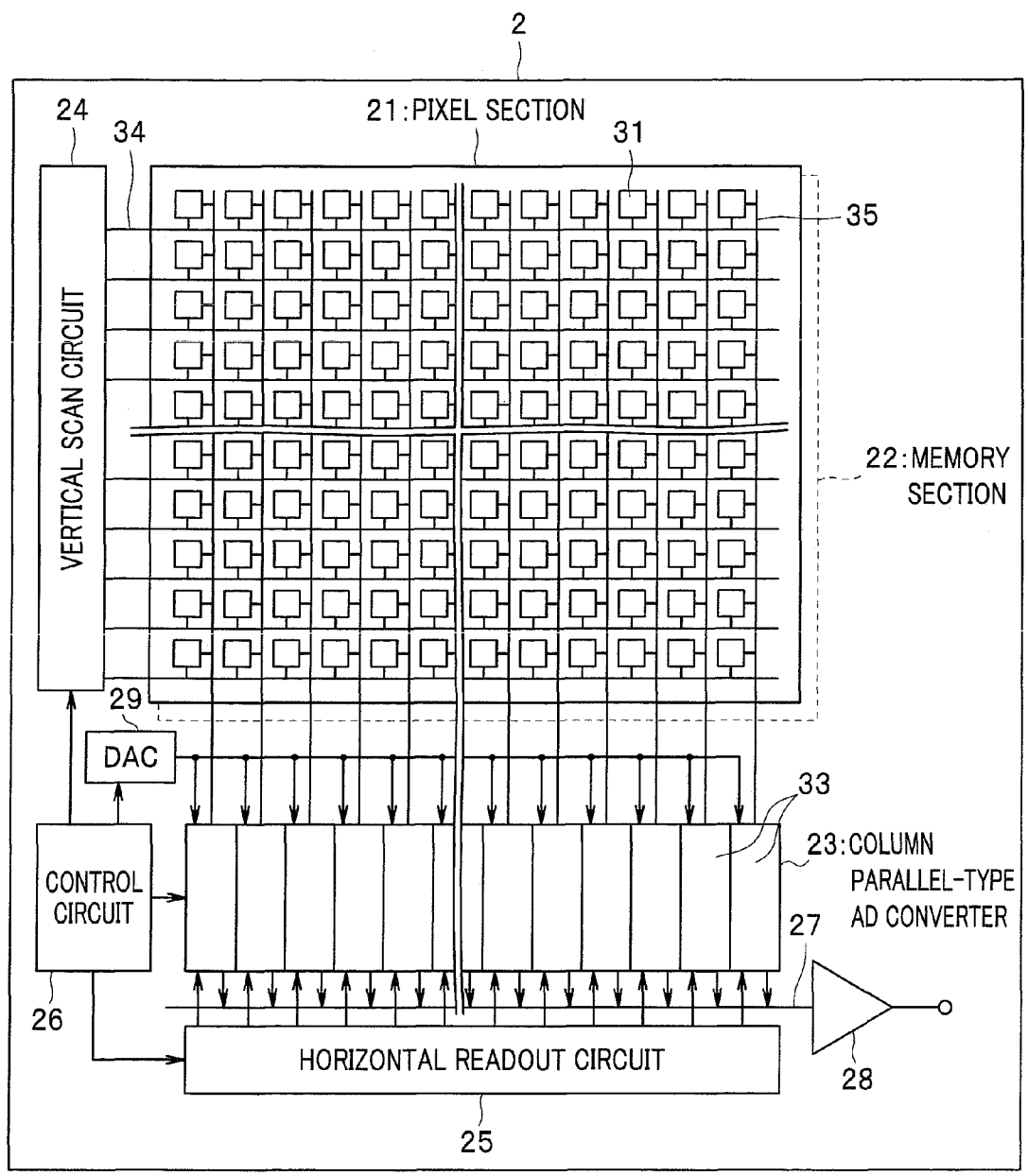
FIG. 2 is a diagram illustrating a configuration of an image pickup section in Embodiment 1 above.

Next, FIG. 2 is a diagram illustrating a configuration of the image pickup section 2.

The image pickup section 2 includes a pixel section 21 including a plurality of pixels 31, a memory section 22, the column parallel-type AD converter 23, a vertical scan circuit 24, a horizontal readout circuit 25, a control circuit 26, a horizontal signal wire 27, a sense amplifier circuit 28 and a DAC (digital-analog converter) 29. Note that the image pickup device 2a of the image pickup section 2 includes at least the pixel section 21 and the vertical scan circuit 24, but the other circuit elements may be provided inside or outside the image pickup device 2a. However, the following description will be provided on the premise that the respective elements in the image pickup section 2 illustrated in FIG. 2 are included in the image pickup device 2a. Also, positions where the respective circuit elements illustrated in FIG. 2 are arranged do not necessarily correspond to actual positions where such circuit elements are arranged.

Figure 3:
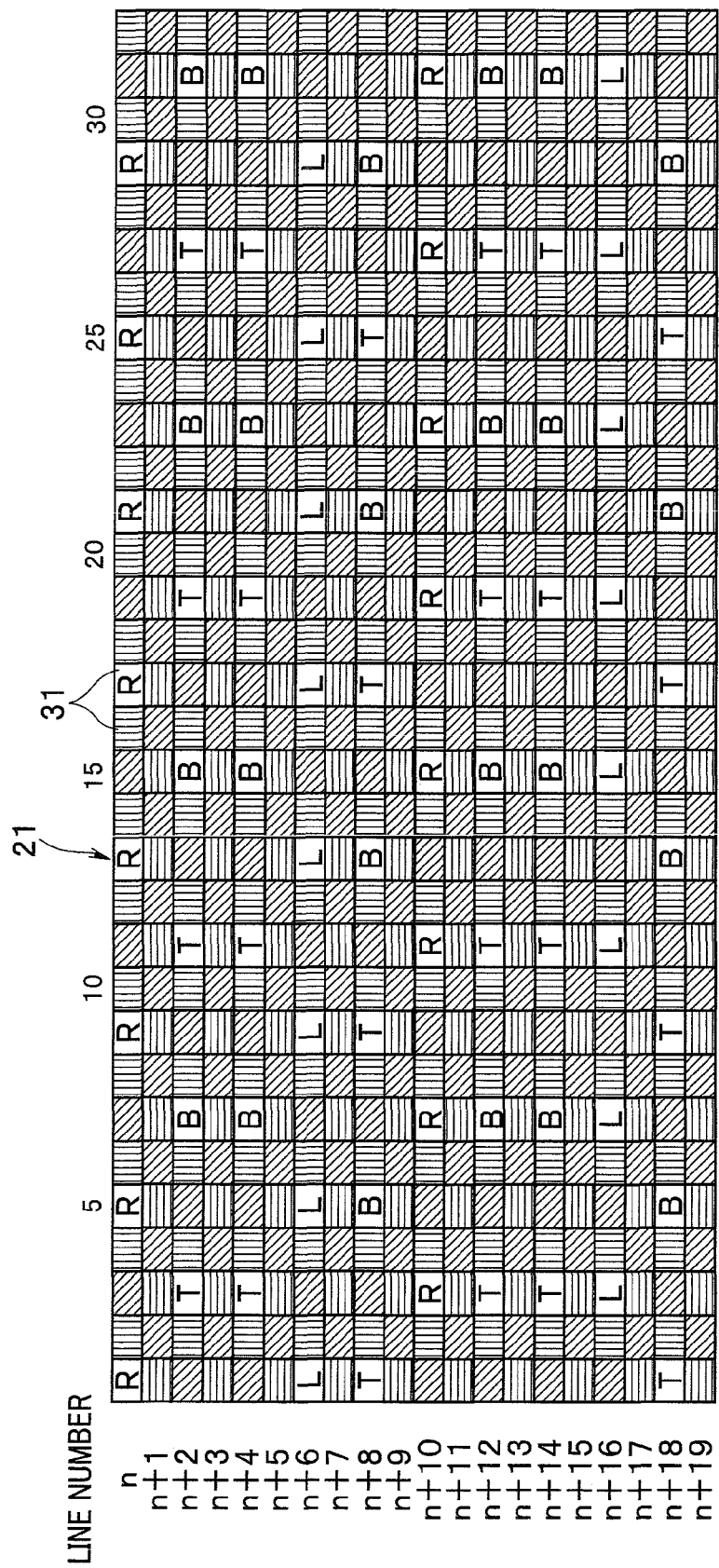
FIG. 3 is a diagram illustrating a configuration of a pixel section in Embodiment 1 above.

The pixel section 21 is an image pickup region in which the plurality of pixels 31 that each generate a signal charge according to an exposure amount are arrayed in a matrix (also see FIG. 3). In the pixel section 21, an array of pixels 31 in a row direction is called, e.g., a "row" or a "line" and an array of pixels 31 in a column direction is called a "column". Also, the row direction is called a horizontal direction, and the column direction is called, e.g., a vertical direction.

The memory section 22 is a storage section that temporarily accumulates signal charges of the respective pixels 31 arrayed in the pixel section 21. The memory section 22 in the present embodiment includes, for example, a number of memory pixels 32 not illustrated in FIG. 3, the number being the same as the number of the respective pixels 31 arrayed in the pixel section 21, the memory pixels 32 being arrayed in a same manner as that of the respective pixels 31 arrayed in the pixel section 21 (in a number of rows and a number of columns that are the same as those of the respective pixels 31 arrayed in the pixel section 21) (see FIGS. 4 and 5 for the memory pixels 32). In terms of the structure, the memory section 22 is arranged, for example, in such a manner that the memory section 22 is stacked on the pixel section 21 in a substrate thickness direction.

The vertical scan circuit 24 includes, e.g., a shift register, control signal wires 34 are connected row by row to the vertical scan circuit 24, enabling control signals for the pixel section 21 and the memory section 22 to be independently outputted row by row. For example, when a global shutter operation is performed, the vertical scan circuit 24 starts exposure by simultaneously resetting all the pixels 31 in the pixel section 21 and terminates the exposure by collectively transferring pixel signals from all the pixels 31 to the memory pixels 32 in the memory section 22. Also, the vertical scan circuit 24 controls readout of the memory pixels 32 arrayed in the memory section 22, for example, on a row-by-row basis.

The vertical signal wires 35 are provided for respective columns of the pixels 31 and the memory pixels 32.

The column parallel-type AD converter 23 includes a plurality of ADCs (analog-digital converters) 33 connected respectively to the plurality of vertical signal wires 35. Since a plurality (or all) of the ADCs 33 can operate simultaneously, analog signals transmitted via a plurality (or all) of the vertical signal wire 35 are simultaneously converted to digital signals. Then, the column parallel-type AD converter 23 performs signal processing, for example, denoising and/or amplification, on pixel signals outputted column by column from the memory pixels 32 in the memory section 22 via the vertical signal wires 35, and further processing for converting the analog pixel signals to digital signals.

The DAC 29 converts a digital signal outputted by the control circuit 26 in order to control the column parallel-type AD converter 23, to an analog signal.

The horizontal readout circuit 25 includes, for example, a shift register, and sequentially selects an ADC 33 in the column parallel-type AD converter 23 for each pixel column from which a pixel signal is to be read out, to sequentially output the pixel signals from the column parallel-type AD converter 23 to the horizontal signal wire 27, thereby reading the pixel signals out.

The sense amplifier circuit 28 performs signal processing, such as amplification, on the pixel signals outputted to the horizontal signal wire 27.

The control circuit 26 is a control section that, based on control performed by the exposure control section 9, generates a clock signal, which serves as a reference for operation, and control signals such as a vertical synchronization signal VD (see, e.g., FIGS. 6 to 10) and a horizontal synchronization signal HD (see, e.g., FIGS. 6 to 10) to control, e.g., the column parallel-type AD converter 23, the vertical scan circuit 24, the horizontal readout circuit 25 and the DAC 29 described above. As will be described later with reference to FIG. 5, the control circuit 26 is configured to further perform control to turn on/off a bias current for the vertical signal wires 35 in the image pickup readout circuit 40a and the focus detection readout circuit 40b via bias current control circuits 36a and 36b, and to turn on/off counters 33b in the ADCs 33 via counter control circuits 37a and 37b.

Next, FIG. 3 is a diagram illustrating a configuration of the pixel section 21.

The focus detection pixels in the pixel section 21 are arranged, for example, in such a manner as illustrated in FIG. 3.

The pixels 31 arrayed in the pixel section 21 include image pickup pixels for picking up an object image, and a focus detection pixel for performing focus detection based on a phase difference. The image pickup pixel group includes a plurality of pixels arrayed in the row direction and the column direction, and the focus detection pixel group includes pixels discretely arranged in the image pickup pixel group. The focus detection pixels in the present embodiment include focus detection pixels R that perform photoelectric conversion of a light ray passing through the right side of the pupil of the lens 1, focus detection pixels L that perform photoelectric conversion of a light ray passing through the left side of the same, focus detection pixels T that perform photoelectric conversion of a light ray passing through the top side of the same and focus detection pixels B that perform photoelectric conversion of a light ray passing through the bottom side of the same. Among these focus detection pixels, a phase difference in the horizontal direction (row direction) is detected based on an image obtained by the focus detection pixels R and an image obtained by the focus detection pixels L, and a phase difference in the vertical direction (column direction) is detected based on an image obtained by the focus detection pixel T and an image obtained by the focus detection pixels B. Note that the focus detection pixels in the present invention is not limited to the above, and focus detection pixels for detecting a phase difference in a right diagonal direction, a left diagonal direction or another direction may be provided. As descried above, detection of not only a phase difference in the horizontal direction, but also a phase difference in a direction other than the horizontal direction is enabled to enhance the focus detection function.

As described above, the pluralities of focus detection pixels R, L, T and B are discretely arranged in the plurality of pixels 31 arrayed in a matrix in the pixel section 21.

More specifically, the focus detection pixels are arranged in the pixel section 21, for example in an arrangement pattern such as illustrated in FIG. 3. Note that, in FIG. 3, the hatchings with diagonal lines extending from the upper left to the lower right indicate green pixels in the image pickup pixels, the hatchings with vertical lines indicate red pixels in the image pickup pixel, and hatching with transverse lines indicate blue pixels in the image pickup pixel, respectively.

In the arrangement pattern in FIG. 3, the focus detection pixels R, L, T and B are arranged only at positions of green pixels in the Bayer array of primary colors, and in particular, in the example illustrated in FIG. 3, only at positions of green pixels in columns that are shared with the blue pixels. Lines in which any of the focus detection pixels R, L, T and B is arranged at a ratio of one pixel out of four pixels, and lines in which none of the focus detection pixels R, L, T and B is arranged exist alternately.

More specifically, where only the lines in which any of the focus detection pixels R, L, T and B is arranged are indicated in the order of line numbers, the lines are line n in which only focus detection pixels R are arranged, line (n+2) in which focus detection pixels T and B are alternately arranged at positions shifted by two pixels in the horizontal direction from line n, line (n+4) whose arrangement in the horizontal direction is the same as that of line (n+2), line (n+6) in which only focus detection pixels L are arranged in an arrangement that is the same as that of line n in the horizontal direction, line (n+8) in which focus detection pixels T and B are alternately arranged at positions shifted by minus two pixels from line (n+2) in the horizontal direction, line (n+10) in which only focus detection pixels R are arranged at positions shifted by two pixels from line n in the horizontal direction, line (n+12) and line (n+14) whose arrangement in the horizontal direction is the same as that of line (n+2), line (n+16) in which only focus detection pixels L are arranged in an arrangement that is the same as that of line (n+10) in the horizontal direction, and line (n+18) whose arrangement is the same as that of line (n+8) in the horizontal direction.

As described above, in the example illustrated in FIG. 3, the focus detection pixels R, L, T and B are arranged at a ratio of one line out of two lines, and at a ratio of one pixel out of horizontal four pixels, and thus, a ratio of the focus detection pixels R, L, T and B in all the pixels is ⅛. Therefore, for example, in 640 pixels in 20 rows and 32 columns such as illustrated in FIG. 3, 80 pixels, which is ⅛ of the 640 pixels, are focus detection pixels R, L, T and B.

Figure 4:
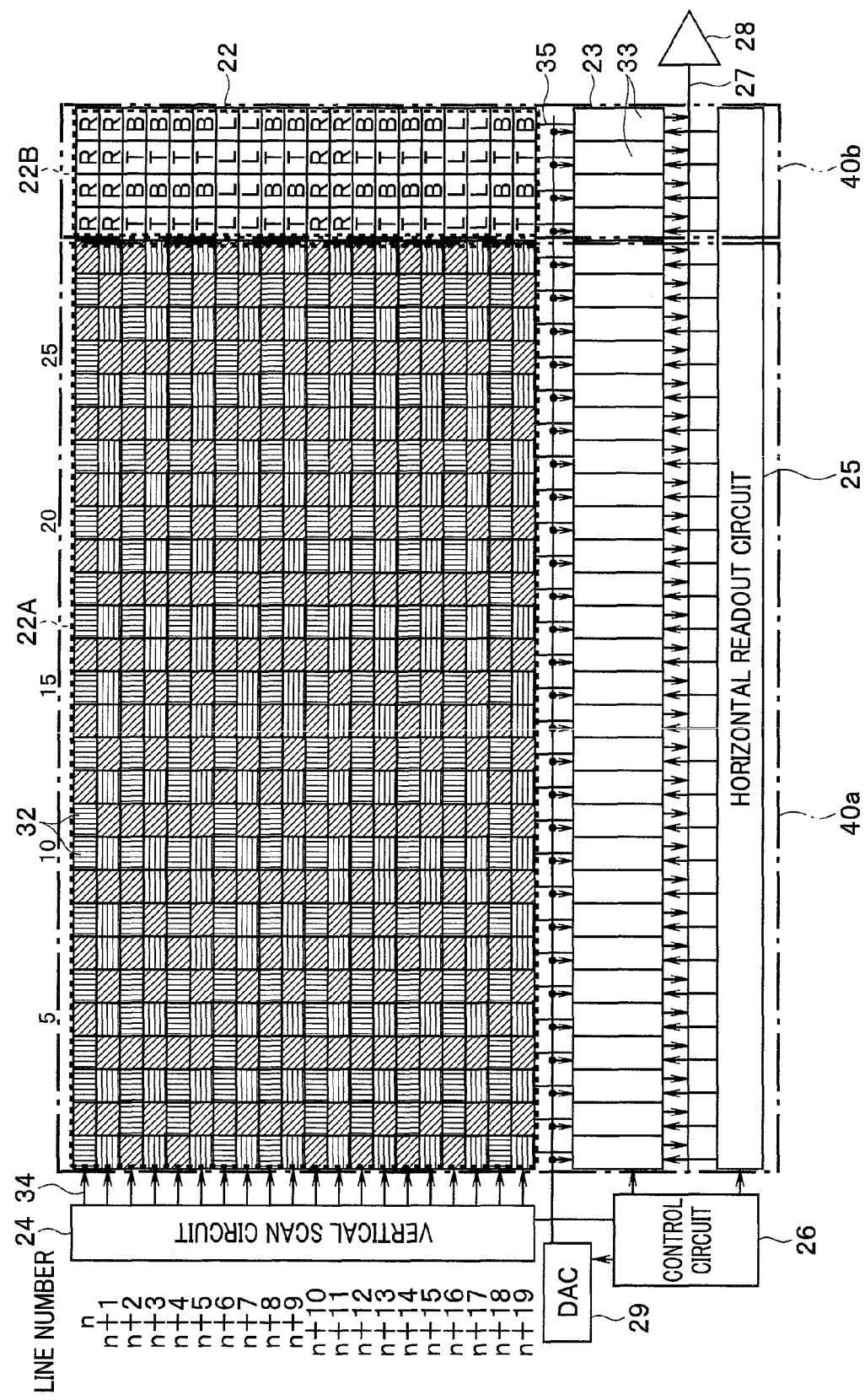
FIG. 4 is a diagram illustrating a configuration of a memory section in Embodiment 1 above.

Next, FIG. 4 is a diagram illustrating a configuration of the memory section 22.

In the memory section 22, the plurality of memory pixels 32 that accumulate signals from the pixels are arrayed in the row direction and the column direction, and in the present embodiment, as described above, the number of memory pixels 32 is the same as the number of pixels 31 provided in the pixel section 21 (that is, the pixel number that is a sum of the image pickup pixel group and the focus detection pixel group), and the number of rows, and the number of columns, of the memory pixels 32 are the same as those of the pixels 31 arrayed in the pixel section 21.

However, pixel signals from the pixels 31 in the pixel section 21 are not necessarily stored in memory pixels 32 in the memory section 22 at respective row and column positions that are the same as those of the pixels 31, and readout signal wires connecting the pixels 31 and the memory pixels 32 are properly extended so that pixel signals from the focus detection pixels R, L, T and B are transferred so as to be concentrated in a particular column group in the memory section 22.

More specifically, in the example illustrated in FIG. 4, pixel signals read out from the focus detection pixels R, L, T and B, which are 80 pixels illustrated in FIG. 3, are transferred so as to be concentrated in a focus detection memory region 22B including 29th to 32nd columns in a right end (20 rows×4 columns=80 pixels). Also, first to 28th columns in the memory section 22 are included in an image pickup memory region 22A for storing pixel signals from the image pickup pixels.

Note that in order to avoid unnecessary complexity of the wirings and also avoid unnecessary complexity of image processing after readout, it is preferable to set positions of the memory pixels 32 corresponding to the pixels 31 in the focus detection memory region 22B so that the positions are highly similar to the arrangement of the focus detection pixels R, L, T and B in the pixel section 21 to the extent possible. Therefore, in the example illustrated in FIG. 4, for example, pixel signals from the focus detection pixels R arrayed in the n line in the pixel section 21 illustrated in FIG. 3 are stored in the memory pixels 32 in the 29th to 32nd columns in the n line and the (n+1) line, and pixel signals from the focus detection pixels T and B arrayed in the (n+2) line in the pixel section 21 illustrated in FIG. 3 are stored in the memory pixel 32 in the 29th to 32nd columns in the (n+2) line and the (n+3) line.

Likewise, for connection between the image pickup pixel group in the pixel section 21 and the image pickup memory region 22A in the first to 28th columns in the memory section 22, it is also preferable to connect the wires so as to avoid unnecessary complexity of the wiring and also avoid unnecessary complexity of image processing after readout.

Therefore, in the example illustrated in FIG. 4, pixel signal transfer is performed as follows. First, the number of memory pixel columns in the image pickup memory region 22A illustrated in FIG. 4 is 28. On the other hand, in the pixel section 21 illustrated in FIG. 3, the number of image pickup pixels in each of lines n, (n+2), (n+4), . . . (in the following, these lines are referred to as even-numbered lines on the assumption that n is an even number) is (32-8)=24, and the number of image pickup pixels in each of lines (n+1), (n+3), (n+5), . . . (likewise, in the following, these lines are referred to odd-numbered lines) is 32, and thus, compared to the memory pixel column count, which is 28, in the image pickup memory region 22A in FIG. 4, the number count in the even-numbered lines in the pixel section 21 illustrated in FIG. 3 is smaller by four pixels and the pixel count in the odd-numbered lines is larger by four pixels. Therefore, arrangement is made so that pixel signals read out from, for example, odd-numbered line (n+1) in the pixel section 21 illustrated in FIG. 3 are stored in even-numbered line n in the image pickup memory region 22A illustrated in FIG. 4 at a ratio of one pixel out of horizontal eight pixels.

Note that the wirings from the pixel section 21 to the memory section 22 are not limited to the example illustrated in FIGS. 3 and 4 and other efficient wirings may arbitrarily be used.

For example, the memory pixel columns may be divided into columns in which only pixel signals from the focus detection pixels R and L are stored and columns in which only pixel signals from the focus detection pixels T and B are stored. In this case, only phase difference AF in the horizontal direction or phase difference AF in the vertical direction can be performed as desired by selecting memory pixel columns to be read out, whereby the number of ADCs 33 to be put into operation can be reduced, enabling further electric power saving.

The memory pixels 32 arrayed in each column in the memory section 22 are connected to the corresponding vertical signal wire 35 provided for the relevant column, and a pixel signal from a memory pixel 32 in a row selected by a vertical scan circuit 24 and a column selected by a horizontal readout circuit 25 is read out.

The read-out pixel signal is converted to a digital signal by the corresponding ADC 33 in the column parallel-type AD converter 23, amplified by the sense amplifier circuit 28 via the horizontal signal wire 27, and outputted.

In such configuration, the image pickup memory region 22A and parts of the column parallel-type AD converter 23 and the horizontal readout circuit 25 for reading out a pixel signal from the image pickup memory region 22A provide an image pickup readout circuit 40a, and the focus detection memory region 22B and parts of the column parallel-type AD converter 23 and the horizontal readout circuit 25 for reading out a pixel signal from the focus detection memory region 22B provide a focus detection readout circuit 40b.

With FSIs (front surface-type imagers), which are conventionally prevalent, it is difficult to provide wirings for rearranging pixel signals from the pixel 31 in the pixel section 21 for easy readout and storing the rearranged pixel signals in the memory pixels 32 in the memory section 22; however, with stack-type imagers such as described in the present embodiment and BSIs (back surface-type imagers), which have been becoming popular in recent years, provide a large degree of freedom in wirings, and thus, such wirings are practically possible. Note that signal outputs from the pixels 31 are preferably provided in a source follower form, and in this case, even the wirings are long, signal deterioration can be suppressed.

Figure 5:
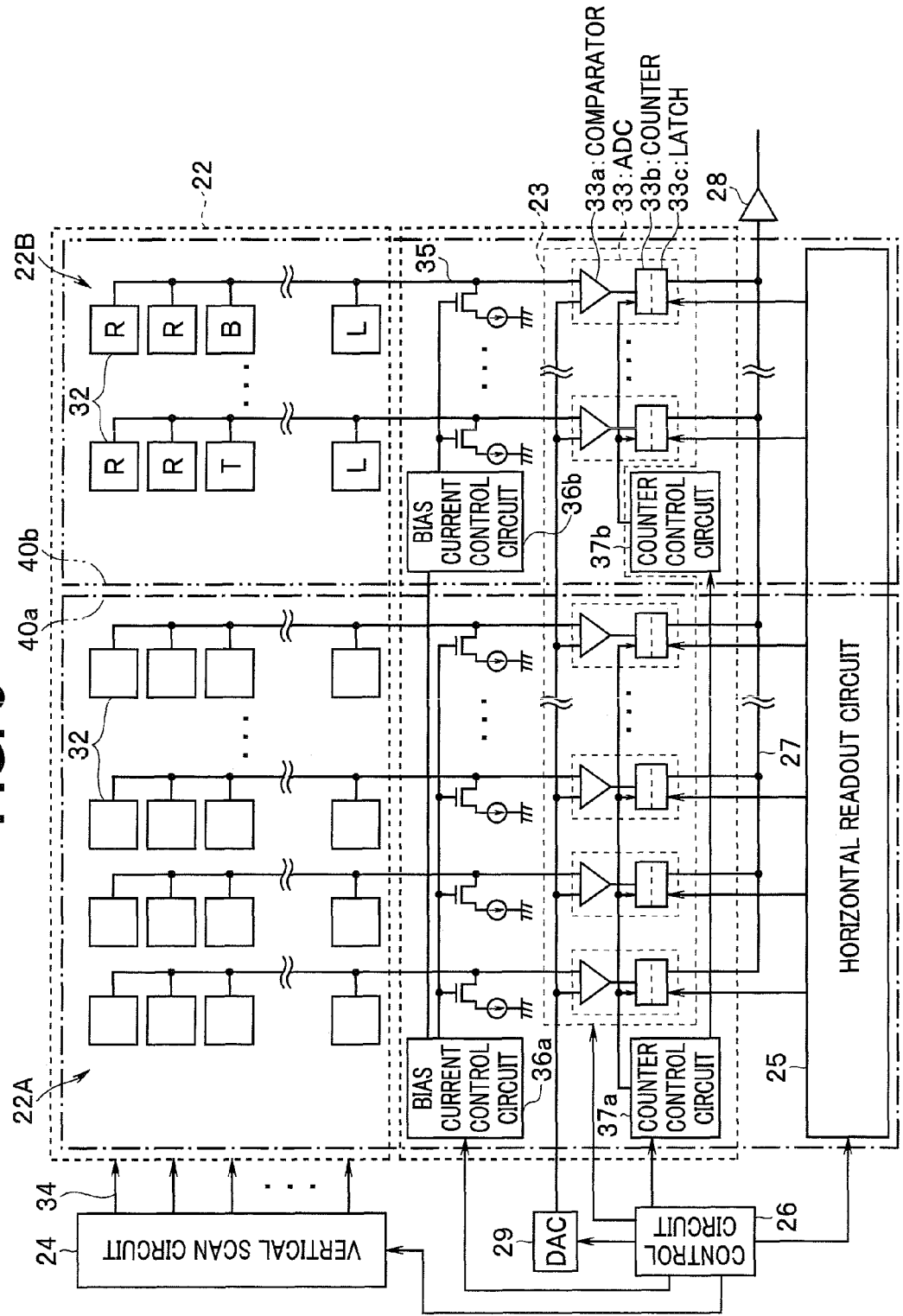
FIG. 5 is a diagram illustrating a configuration of a column parallel-type AD converter in the image pickup section according to Embodiment 1 above in more detail.

Next, FIG. 5 is a diagram illustrating a configuration of the column parallel-type AD converter 23 in the image pickup section 2 in more detail.

In the column parallel-type AD converter 23, the ADCs 33 included in the image pickup readout circuit 40a provide a column parallel-type first AD converter that converts only signals from pixels belonging to the image pickup pixel group to digital signals, and the first AD converter and the first bias current control circuit 36a provide a first readout circuit, and the memory pixel columns in the image pickup memory region 22A are first memory pixel columns connected to the first readout circuit. Therefore, the image pickup pixel group is connected to the first memory pixel columns.

Also, the ADCs 33 included in the focus detection readout circuit 40b provide a column parallel-type second AD converter that converts only signals from the pixels belonging to the focus detection pixel group to digital signals, and the second AD converter and the second bias current control circuit 36b provide a second readout circuit, and the memory pixel columns in the focus detection memory region 22B are second memory pixel columns connected to the second readout circuit. Therefore, the focus detection pixel group is connected to the second memory pixel columns.

Note that, in the example illustrated in FIGS. 3 to 5, the total number of focus detection pixels in the pixel section 21 is just an integral multiple of the number of memory pixels included in the memory pixel columns in the memory section 22, and thus, each of the ADCs 33 is included in either the first AD converter or the second AD converter. On the other hand, if the total number is not an integral multiple of the number of memory pixels, at least one memory pixel column stores both pixel signals from image pickup pixels and pixel signals from focus detection pixels, and thus, the ADC 33 connected to this memory pixel column is included in neither the first AD converter nor the second AD converter, and is one that should be called a hybrid converter.

Next, each of the ADCs 33 provided for the respective columns in the column parallel-type AD converter 23 include a comparator 33a, a counter 33b and a latch 33c.

The above-described DAC 29 outputs a reference voltage to the comparator 33a based on a control signal from the control circuit 26. Here, the reference voltage outputted by the DAC 29 has a voltage of a ramp waveform that changes in a slope form.

Upon input of an analog pixel signal from the corresponding vertical signal wire 35, the comparator 33a compares a voltage of the input pixel signal with the reference voltage. Then, if a relationship in magnitude between the voltage of the pixel signal and the reference voltage is reversed, the comparator 33a reverses an output signal. Here, the comparator 33a has a configuration of a general differential amplifier including, for example, a plurality of PMOS transistors and a plurality of NMOS transistors, and consumes electric power during operation. Although not illustrated, a capacitor for storing a reset level (reset noise) is connected to each of a part of the comparator 33a that is connected to a signal wire from the DAC 29 and a part of the comparator 33a that is connected to the vertical signal wire 35. These capacitors are configured to be reset in response to an instruction signal from the control circuit 26.

The counter 33b digitally counts a time period until the output signal from the comparator 33a is reversed, that is, a time period until the relationship in magnitude between the reference voltage of a ramp waveform and the voltage of the pixel signal is reversed (comparison time period), for example, in the form of the number of input clocks.

The latch 33c functions as a digital memory that holds a result of counting by the counter 33b, and is connected to the sense amplifier circuit 28 via the horizontal signal wire 27. The latch 33c is connected also to the horizontal readout circuit 25, and is configured to, when the horizontal readout circuit 25 selects the latch 33c and inputs a control signal thereto, output the held digital signal.

In such configuration, the bias current control circuit 36a and the counter control circuit 37a are provided in the image pickup readout circuit 40a, and the bias current control circuit 36b and the counter control circuit 37b are provided in the focus detection readout circuit 40b, respectively.

In order to provide a source-follower output of only signals that have been transferred to the memory pixels from the pixels belonging to the image pickup pixel group, the bias current control circuit 36a performs control to turn on/off a bias current in each vertical signal wire 35 in the image pickup readout circuit 40a based on control performed by the control circuit 26.

Likewise, in order to provide a source-follower output of only signals that have been transferred to the memory pixel from the pixels belonging to the focus detection pixel group, the bias current control circuit 36b performs control to turn on/off a bias current in each vertical signal wire 35 in the focus detection readout circuit 40b based on control performed by the control circuit 26.

Also, the counter control circuit 37a performs control to turn on/off the respective counters 33b in the image pickup readout circuit 40a based on control performed by the control circuit 26.

Likewise, the counter control circuit 37b performs control to turn on/off the respective counters 33b in the focus detection readout circuit 40b based on control performed by the control circuit 26.

Here, a constant current section forming a source follower circuit, and a single slope-type column parallel ADC are circuit portions that consume a large amount of power in the image pickup device according to the present embodiment.

Therefore, the above-described configuration enables the image pickup section 2 to perform control to turn on/off the image pickup readout circuit 40a and control to turn on/off the focus detection readout circuit 40b independently from each other, enabling substantial power consumption reduction to be achieved by turning off either the image pickup readout circuit 40a or the focus detection readout circuit 40b if there is no need to make the relevant readout circuit 40a or 40b operate.

Thus, the control circuit 26 is a control section that controls operation of the first readout circuit including the first AD converter and the bias current control circuit 36a and if no AD conversion for the image pickup pixel group is performed, stops operation of the first AD converter, and further stops operation of the bias current control circuit 36a as necessary, as well as a control section that controls operation of the second readout circuit including the second AD converter and the bias current control circuit 36b, and if no AD conversion for the focus detection pixel group is performed, stops operation of the second AD converter, and further stops operation of the bias current control circuit 36b as necessary.

Consequently, a readout that is efficient, i.e., high speed and low power consuming, according to a sequence can be selected and controlled.

Next, several example sequences employed in the image pickup device according to the present embodiment will be described with reference to FIGS. 6 to 10.

Figure 6:
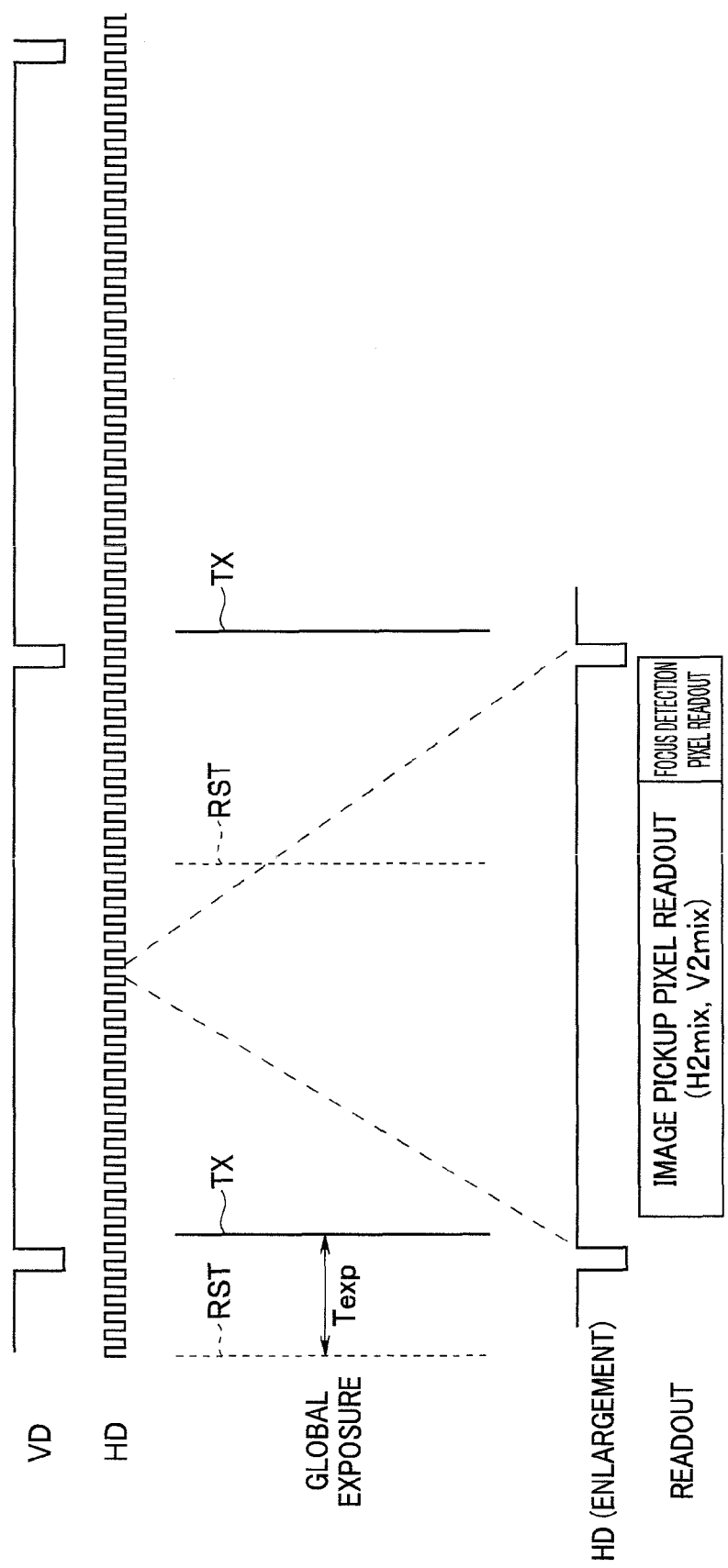
FIG. 6 is a timing chart indicating image pickup sequence A in Embodiment 1 above.

First, FIG. 6 is a timing chart indicating image pickup sequence A.

A global exposure starts as a result of all the pixels 31 in the pixel section 21 being collectively reset (RST), and ends as a result of pixel signals accumulated in all the pixels 31 being collectively transferred (TX) to the memory pixels 32 in the memory section 22 upon passage of a predetermined exposure time period Texp.

Readout of pixel signals from the memory section 22 is performed in synchronization with timings determined by the vertical synchronization signal VD and the horizontal synchronization signal HD.

Upon execution of image pickup sequence A for the readout, during one cycle of the horizontal synchronization signal HD, pixel signals from the image pickup pixels and pixel signals from the focus detection pixel stored in the memory pixels 32 in one line of the memory section 22 are read out. Note that, although FIG. 6 (and FIG. 7 referred to below) indicates an example in which readout is performed with two image pickup pixels added in each of the horizontal direction and the vertical direction (H2mix, V2mix), it should be understood that the present invention is not limited to this example and readout can be performed with no image pickup pixel added or with another number of pixels added, or, e.g., thinned readout can be performed.

Therefore, in image pickup sequence A, both the image pickup readout circuit 40a and the focus detection readout circuit 40b are on.

Figure 7:
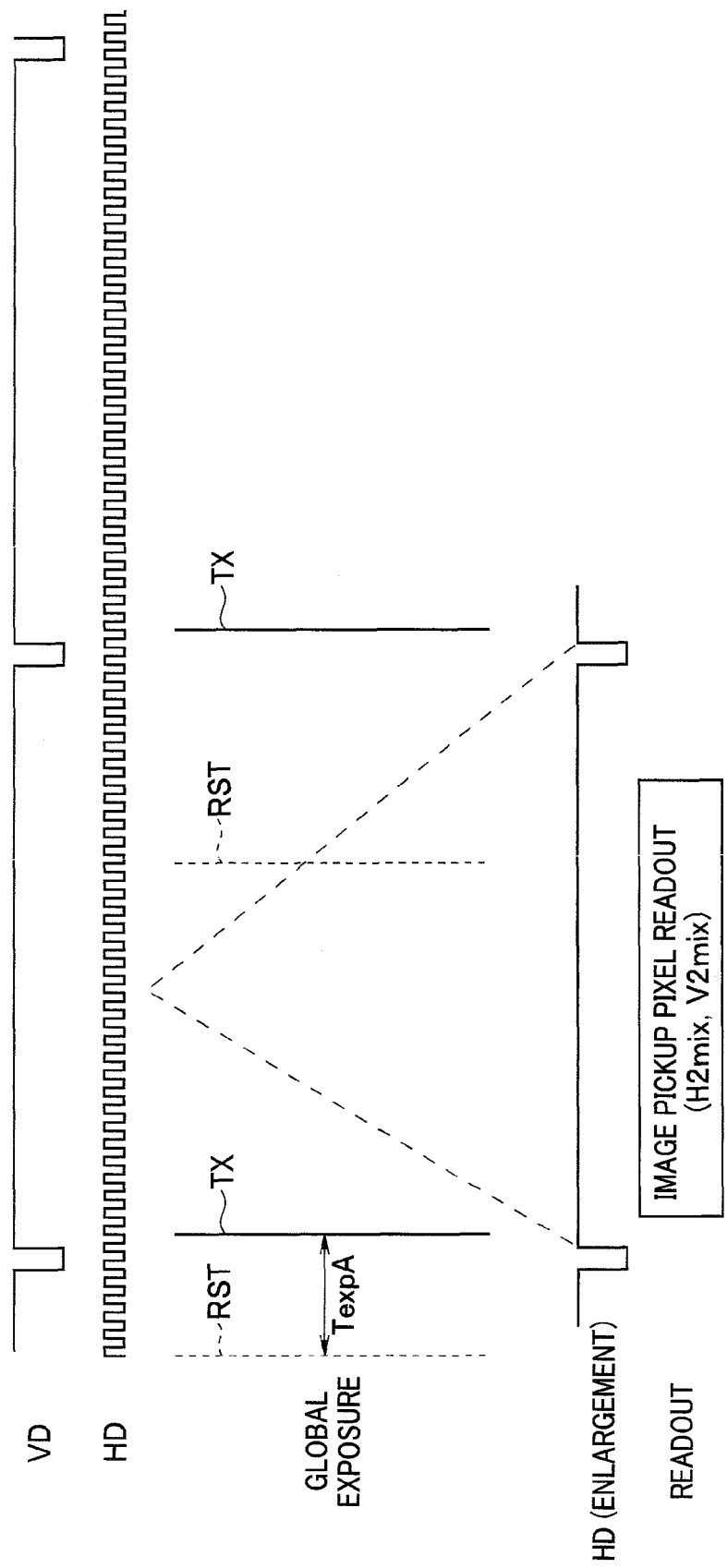
FIG. 7 is a timing chart indicating image pickup sequence B1 in Embodiment 1 above.

Next, FIG. 7 is a timing chart indicating image pickup sequence B1.

Upon execution of image pickup sequence B1, during one cycle of the horizontal synchronization signal HD, only pixel signals from the image pickup pixels stored in the memory pixels 32 in one line of the memory section 22 are read out, and no readout of pixel signals from the focus detection pixels is performed. Accordingly, an exposure time period TexpA is an exposure time period that is suitable for image pickup.

Therefore, in image pickup sequence B1, the image pickup readout circuit 40a is on, but the focus detection readout circuit 40b is off. In other words, if only pixel signals from the image pickup pixels are read out, the focus detection readout circuit 40b is turned off, enabling power consumption reduction.

Figure 8:
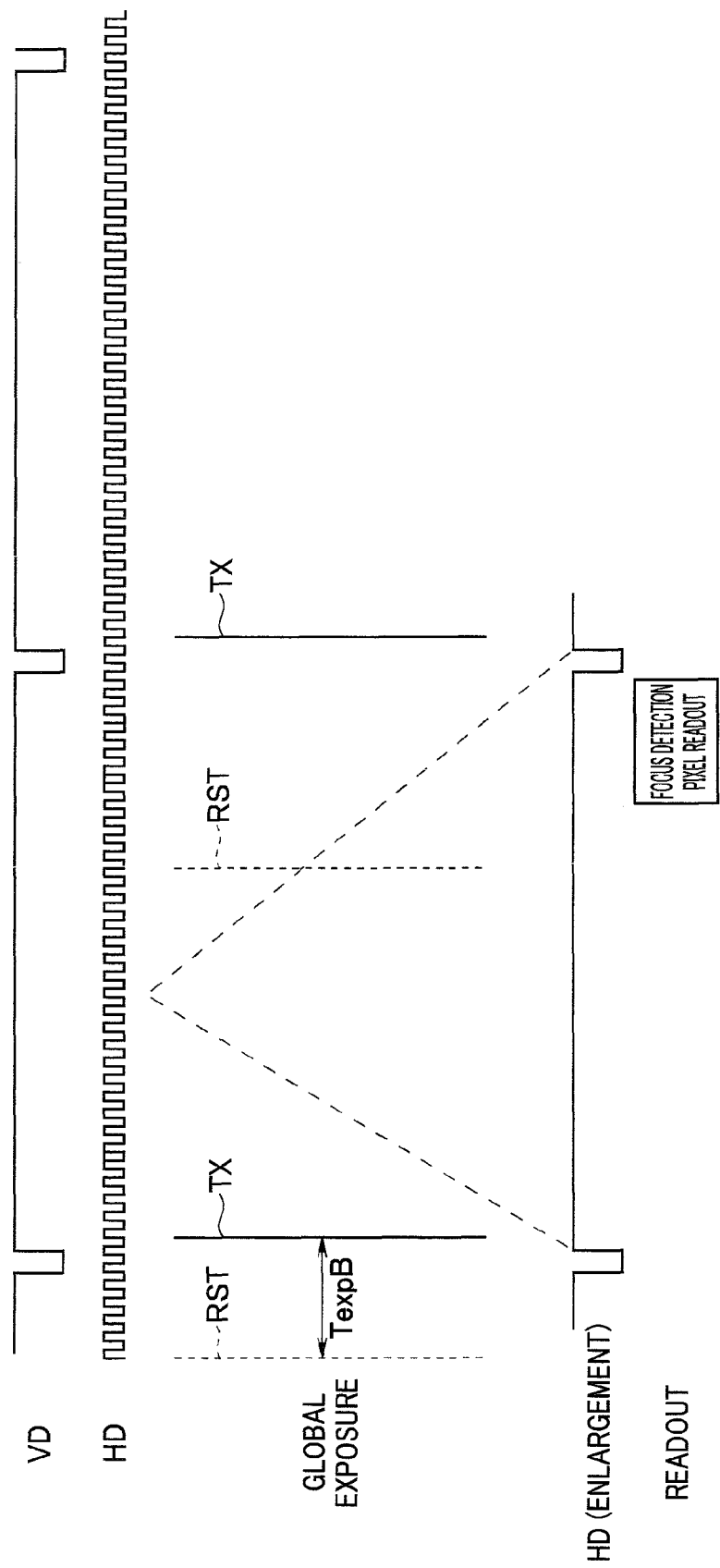
FIG. 8 is a timing chart indicating image pickup sequence B2 in Embodiment 1 above.

Next, FIG. 8 is a timing chart indicating image pickup sequence B2.

Upon execution of image pickup sequence B2, during one cycle of the horizontal synchronization signal HD, only pixel signals from the focus detection pixels stored in the memory pixels 32 in one line of the memory section 22 are read out and no readout of pixel signals from the image pickup pixels is performed. Accordingly, an exposure time period TexpB is an exposure time period that is suitable for focus detection.

Therefore, in image pickup sequence B2, the focus detection readout circuit 40b is on, but the image pickup readout circuit 40a is off. In other words, if only pixel signals from the focus detection pixel are read out, the image pickup readout circuit 40a is turned off, enabling power consumption reduction.

In actual operation, there is no need to perform readout for the focus detection pixels in each frame, and it is sufficient that the readout is performed at a ratio of one frame out of every several to several tens of frames. In this case, it is only necessary to repeatedly execute image pickup sequence B1 and execute image pickup sequence B2 at a ratio of one frame out of every several to several tens of frames (such sequence resulting from properly combining image pickup sequence B1 and image pickup sequence B2 is referred to as image pickup sequence B).

Figure 9:
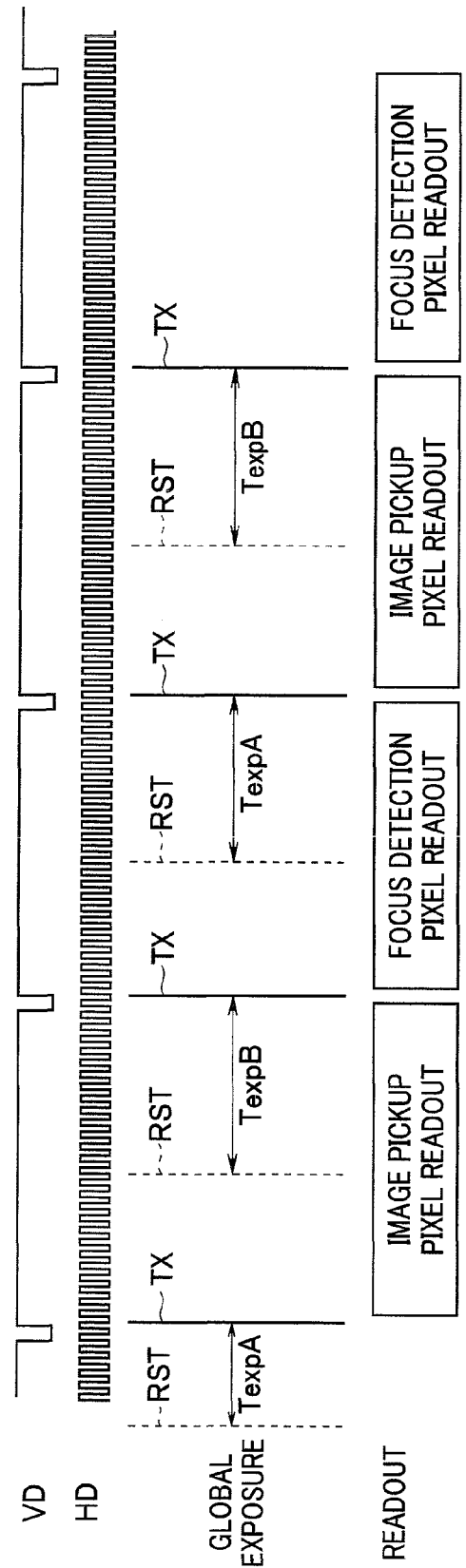
FIG. 9 is a timing chart indicating image pickup sequence C1 in Embodiment 1 above.

FIG. 9 is a timing chart indicating image pickup sequence C1.

First, in a global exposure performed prior to readout, an exposure time period TexpA before readout of pixel signals from the image pickup pixels is set so as to be an exposure time period that is suitable for image pickup and an exposure time period TexpB before readout of pixel signals from the focus detection pixels is set so as to be an exposure time period that is suitable for focus detection, respectively and separately.

Then, upon execution of image pickup sequence C1, a frame in which only pixel signals from the image pickup pixels stored in each memory pixel 32 in the image pickup memory region 22A of the memory section 22 are read out during one cycle of the vertical synchronization signal VD and a frame in which only pixel signals from the focus detection pixels stored in each memory pixel 32 in the focus detection memory region 22B of the memory section 22 during one cycle of the vertical synchronization signal VD are alternately executed.

Therefore, in image pickup sequence C1, the image pickup readout circuit 40a and the focus detection readout circuit 40b are alternately turned on on a frame-by-frame basis: in one frame in which one of the readout circuits is on, the other readout circuit is off. Consequently, the image pickup readout circuit 40a and the focus detection readout circuit 40b are alternately turned off on a frame-by-frame basis, enabling power consumption reduction.

Figure 10:
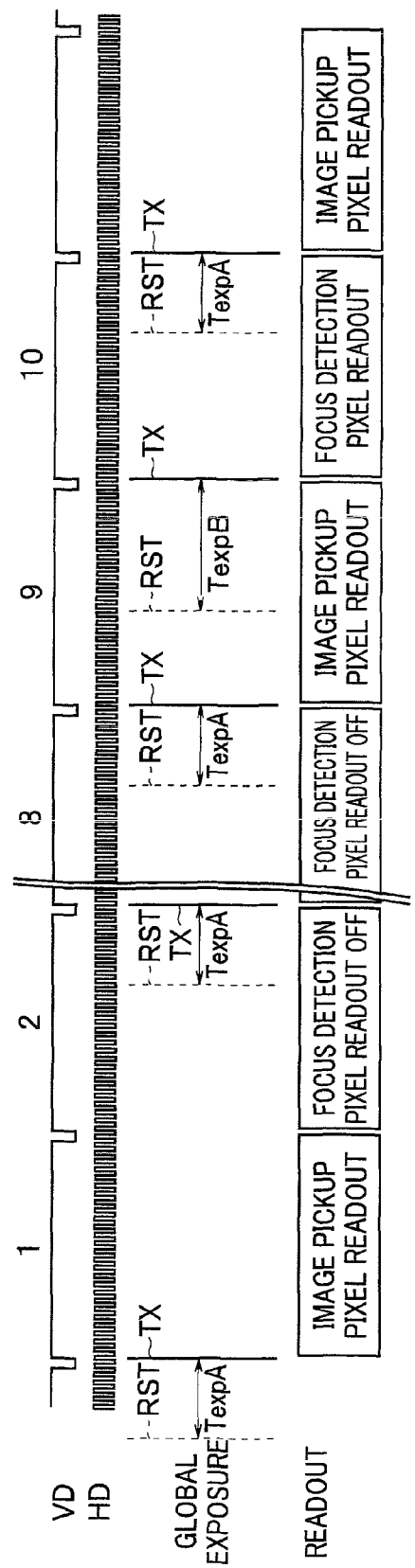
FIG. 10 is a timing chart indicating image pickup sequence C2 in Embodiment 1 above.

FIG. 10 is a timing chart indicating image pickup sequence C2.

As described above, in actual operation, there may be no need to perform readout for the focus detection pixels in each frame. Therefore, image pickup sequence C2 is arranged so that image pickup sequence C1 illustrated in FIG. 9 is basically used, and exposure and readout for the focus detection pixels are performed at a ratio of, for example, one out of ten frames.

In other words, in all of first, third, fifth, seventh and ninth frames, pixel signals from the image pickup pixels are read out. On the other hand, in second, fourth, sixth and eighth frames, readout of pixel signals from the focus detection pixel is halted, and in a tenth frame, pixel signals from the focus detection pixels are read out.

In image pickup sequence C2, such ten frame operation is repeatedly performed. Consequently, relative to image pickup sequence C1, arrangement is further made so that operation of the focus detection readout circuit 40b is off in four chances out of every five chances, enabling further power consumption reduction.

FIG. 11 is a table indicating an example in which operating states of the image pickup readout circuit 40a and the focus detection readout circuit 40b and power consumption in each image pickup sequence are compared with a conventional technique.

As with the conventional technique, image pickup sequence A is executed with both the image pickup readout circuit 40a and the focus detection readout circuit 40b on, power consumption is the same as that of the conventional technique. Therefore, assuming that the power consumption in image pickup sequence A is a reference value of 1, power consumption in each of the other image pickup sequences is indicated.

Note that the below-indicated values are values calculated by taking a case where power consumption in the constant current circuit section forming the source follower circuit and the ADCs 33 account for 50% of the entire power consumption as an example and putting such case into a simple model.

In each of image pickup sequences B1, B2, C1 and C2, when pixel signals from the image pickup pixel stored in the memory section 22 are read out, operation of the focus detection readout circuit 40b is off, and when pixel signals from the focus detection pixels stored in the memory section 22 are read out, operation of the image pickup readout circuit 40a is off.

Therefore, in the example illustrated in FIG. 11, the power consumption in image pickup sequence B1 is 0.9375, the power consumption in image pickup sequence B2 is 0.5625, the power consumption in image pickup sequence C1 is 0.7500, and the power consumption in image pickup sequence C2 is 0.5625.

Note that if processing similar to image pickup sequence C2 is performed in the conventional technique, frames in which readout is halted occur and thus the power consumption is reduced to, for example, 0.6667, which is, however, a value that is larger than 0.5625 in image pickup sequence C2 in the present invention (providing a 10% power consumption reduction effect).

Therefore, use of any of image pickup sequences B1, B2, C1 and C2 (or use of a combination of any of these sequences) enables efficient power consumption reduction compared to the conventional technique.

Note that, although the above description has been provided taking a case where each of the first AD converter and the second AD converter is of the column parallel-type as an example, the present invention is not limited to this case, and each of the first AD converter and the second AD converter may be, for example, a pixel ADC that performs AD conversion for each pixel.

According to Embodiment 1 described above, the first readout circuit including the first AD converter that converts only signals from the pixels belonging to the image pickup pixel group to digital signals, and the second readout circuit including the second AD converter that converts only signals from the pixels belonging to the focus detection pixel group into digital signals are provided in the image pickup device, enabling efficient readout according to an image pickup sequence to be performed.

Then, where the first AD converter and the second AD converter are of the column parallel-type, a contrivance is made in wirings for connection from the pixel section 21 to the memory section 22 so as to connect the image pickup pixel group to the first memory pixel columns connected to the first readout circuit, and connect the focus detection pixel group to the second memory pixel columns connected to the second readout circuit, enabling efficient column-by-column readout.

Furthermore, the pixel count that is a sum of the image pickup pixel group and the focus detection pixel group in the pixel section 21 and the count of the memory pixels provided in the memory section 22 are made equal to each other, enabling the memory pixel count to be suppressed to a bare minimum, and consequently enabling the number of the ADCs 33 and the number of times of operation of the ADCs 33 to be minimized, enabling power consumption reduction.

Furthermore, if no AD conversion for the image pickup pixel group is performed, the control circuit 26 stops operation of the first AD converter, enabling reduction in power consumption when only pixel signals from the focus detection pixel group are read out. In this case, the power consumption can further be reduced by further stopping the first bias current control circuit 36*a*.

In addition, if no AD conversion for the focus detection pixel group is performed, the control circuit 26 stops operation of the second AD converter, enabling reduction in power consumption when only pixel signals from the image pickup pixel group are read out. In this case, the power consumption can further be reduced by further stopping the second bias current control circuit 36*b*.

Also, since the image pickup apparatus includes a focus detection/control section that includes, e.g., the AF evaluation value operation section 4, the camera control section 12 and the focus control section 10, and controls a focus state based on digital signals resulting from conversion by the second AD converter, whereby a focal position of the lens 1 is adjusted to achieve focus based on image plane phase difference AF that eliminates the need for, e.g., separate phase difference AF elements.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup device comprising:
   an image pickup pixel group including a plurality of pixels arrayed in a row direction and a column direction;
   a focus detection pixel group of focus detection pixels discretely arranged in the image pickup pixel group;
   a first readout circuit including a first AD converter provided for converting only signals from pixels belonging to the image pickup pixel group to digital signals; and
   a second readout circuit including a second AD converter provided for converting only signals from pixels belonging to the focus detection pixel group to digital signals, the second AD converter being different from the first AD converter.

2. The image pickup device according to claim 1,
   wherein each of the first AD converter and the second AD converter is of a column parallel-type;
   wherein the image pickup device further comprises a memory section including a plurality of memory pixels arrayed in the row direction and the column direction, the memory pixels accumulating the signals from the pixels and including first memory pixel columns connected to the first readout circuit, and second memory pixel columns connected to the second readout circuit; and
   wherein the image pickup pixel group is connected to the first memory pixel columns and the focus detection pixel group is connected to the second memory pixel columns.

3. The image pickup device according to claim 2, wherein a pixel count that is a sum of the image pickup pixel group and the focus detection pixel group and a count of the memory pixels provided in the memory section are equal to each other.

4. The image pickup device according to claim 1, further comprising a control section that controls operation of the first readout circuit, and if no AD conversion for the image pickup pixel group is performed, stops operation of the first AD converter.

5. The image pickup device according to claim 4,
   wherein the first readout circuit further includes a first bias current control circuit that provides a source-follower output of only the signals of the pixels belonging to the image pickup pixel group; and
   wherein if no AD conversion for the image pickup pixel group is performed, the control section further stops the first bias current control circuit.

6. The image pickup device according to claim 1, further comprising a control section that controls operation of the second readout circuit, and if no AD conversion for the focus detection pixel group is performed, stops operation of the second AD converter.

7. The image pickup device according to claim 6,
   wherein the second readout circuit further includes a second bias current control circuit that provides a source-follower output of only the signals from the pixels belonging to the focus detection pixel group; and
   wherein if no AD conversion for the focus detection pixel group is performed, the control section further stops the second bias current control circuit.

8. An image pickup apparatus comprising an image pickup device according to claim 1.

9. The image pickup apparatus according to claim 8, further comprising a focus detection/control section that controls a focus state based on the digital signals resulting from the conversion by the second AD converter.

* * * * *